(12) United States Patent
Russell

(10) Patent No.: US 10,323,149 B2
(45) Date of Patent: Jun. 18, 2019

(54) SYSTEM, METHOD, APPARATUS, MEANS, AND COMPUTER PROGRAM PRODUCT FOR RECYCLING ASPHALT SHINGLES

(71) Applicant: Atlas James Russell, Albermarle, NC (US)

(72) Inventor: Atlas James Russell, Albermarle, NC (US)

( * ) Notice: Subject to any disclaimer, the term of this patent is extended or adjusted under 35 U.S.C. 154(b) by 0 days.

(21) Appl. No.: 15/922,384

(22) Filed: Mar. 15, 2018

(65) Prior Publication Data

US 2018/0201787 A1 Jul. 19, 2018

Related U.S. Application Data

(62) Division of application No. 14/826,458, filed on Aug. 14, 2015, now Pat. No. 9,951,224.
(Continued)

(51) Int. Cl.
*B01F 5/10* (2006.01)
*B28C 5/46* (2006.01)
(Continued)

(52) U.S. Cl.
CPC ............... *C08L 95/00* (2013.01); *B01F 5/104* (2013.01); *B01F 13/1027* (2013.01);
(Continued)

(58) Field of Classification Search
CPC .......... B01F 13/1011; B01F 2013/1086; B01F 13/1013; B01F 13/1016; B01F 13/1019;
(Continued)

(56) References Cited

U.S. PATENT DOCUMENTS 952,136 A * 3/1910 Peltzer ..................... B01F 5/10
134/60
1,002,246 A * 9/1911 Ellis ............................ 366/290
(Continued)

FOREIGN PATENT DOCUMENTS

CA 2227667 7/1999
CA 2227667 A1 * 7/1999 ............ B01F 3/1221
(Continued)

OTHER PUBLICATIONS

Russian Office Action of the Substantive Examination, Application No. 2017106955/03, dated Mar. 28, 2018.

*Primary Examiner* — Charles Cooley
(74) *Attorney, Agent, or Firm* — Womble Bond Dickinson (US) LLP

(57) ABSTRACT

A method for producing an asphalt mix suitable for use as an asphalt pavement is provided. The method may include receiving in a preliminary mixing unit an asphalt shingle material input from a first feed system and a fluid asphalt material input from a second feed system, and heating and melting the asphalt shingle material and the fluid asphalt material in the preliminary mixing unit and then agitating the same to produce a molten asphalt. The method may include receiving in a primary mixing unit recycled asphalt material input from a third feed system and particulate material input from a fourth feed system, and mixing the molten asphalt from the preliminary mixing unit in the primary mixing unit with the same to produce an output of said asphalt mix. The method may include recirculating, in an intermediate tank, the molten asphalt.

10 Claims, 14 Drawing Sheets

Related U.S. Application Data

(60) Provisional application No. 62/039,149, filed on Aug. 19, 2014.

(51) Int. Cl.
*B01F 13/10* (2006.01)
*C10C 3/00* (2006.01)
*C10C 3/12* (2006.01)
*C08L 95/00* (2006.01)
*E01C 19/10* (2006.01)
*B28C 5/08* (2006.01)

(52) U.S. Cl.
CPC ............ *B28C 5/0875* (2013.01); *B28C 5/466* (2013.01); *C10C 3/007* (2013.01); *C10C 3/12* (2013.01); *E01C 19/1004* (2013.01); *B01F 2013/1086* (2013.01); *C08L 2555/34* (2013.01)

(58) Field of Classification Search
CPC ............ B01F 13/1022; B01F 13/1025; B01F 13/1027; B01F 13/1036; B01F 13/1038; B01F 13/10–2013/1052; C08L 2555/34; B28C 5/0875; B28C 5/0887; B28C 5/1276; B28C 5/1284; B28C 5/145; B28C 5/466
USPC .... 366/15, 23, 290–291, 136, 137, 144–149
See application file for complete search history.

(56) References Cited

U.S. PATENT DOCUMENTS

| | | | | |
|---|---|---|---|---|
| 3,244,407 A * | 4/1966 | Obergfell | D06F 3/085 | 210/193 |
| 3,248,093 A * | 4/1966 | Demaison | B01F 3/1271 | 239/135 |
| 3,338,560 A * | 8/1967 | Katzer | A62C 99/009 | 366/101 |
| 3,369,798 A * | 2/1968 | Avril | B01F 5/247 | 366/7 |
| 3,561,047 A * | 2/1971 | McInnis | B01F 5/10 | 264/328.18 |
| 3,593,928 A * | 7/1971 | Friedland | B01F 3/1271 | 241/14 |
| 3,605,783 A * | 9/1971 | Pecker et al. | A61M 1/1656 | 137/2 |
| 3,778,521 A * | 12/1973 | Fisher et al. | B01F 5/24 | 426/508 |
| 3,830,473 A * | 8/1974 | Lieferman | C08B 30/16 | 366/136 |
| 3,837,914 A * | 9/1974 | Cadeo | B01F 1/00 | 127/22 |
| 3,897,939 A * | 8/1975 | Hostettler | B29D 35/0018 | 366/132 |
| 4,057,443 A * | 11/1977 | Stiling | B01F 3/04453 | 156/43 |
| 4,084,753 A * | 4/1978 | Fruh | B01F 13/10 | 241/188.1 |
| 4,096,586 A * | 6/1978 | Badertscher | A23J 3/10 | 366/136 |
| 4,117,550 A * | 9/1978 | Folland | B01F 3/088 | 137/1 |
| 4,163,712 A * | 8/1979 | Smith | B01F 3/04985 | 210/221.2 |
| 4,409,137 A * | 10/1983 | Mergan | B01F 13/1027 | 159/11.1 |
| 4,475,818 A * | 10/1984 | Bialkowski | B01F 5/104 | 366/137 |
| 4,706,893 A * | 11/1987 | Brock | E01C 19/1036 | 106/282 |
| 5,046,856 A * | 9/1991 | McIntire | B01F 5/0603 | 366/137 |
| 5,052,486 A * | 10/1991 | Wilson | B01F 3/0861 | 166/308.4 |
| 5,114,239 A * | 5/1992 | Allen | B01F 3/04836 | 366/136 |
| 5,197,800 A * | 3/1993 | Saidman | B05D 1/025 | 137/3 |
| 5,201,472 A * | 4/1993 | Brock | B03B 9/065 | 241/101.8 |
| 5,334,496 A * | 8/1994 | Pond | B01F 5/104 | 366/136 |
| 5,348,390 A * | 9/1994 | Schertenleib | B01F 3/1271 | 366/136 |
| 5,571,281 A * | 11/1996 | Allen | B01F 3/12 | 366/163.1 |
| 5,590,960 A * | 1/1997 | Clinton | B01F 13/10 | 366/134 |
| 5,772,731 A * | 6/1998 | Harrison | B01F 3/04985 | 261/DIG. 19 |
| 5,973,109 A * | 10/1999 | Yamazaki | B01F 1/0005 | 528/499 |
| 6,039,470 A * | 3/2000 | Conwell | B01F 5/10 | 366/137 |
| 6,267,847 B1 * | 7/2001 | Doelle | D21B 1/30 | 162/241 |
| 6,383,237 B1 * | 5/2002 | Langer | B01F 3/0807 | 44/301 |
| 6,494,608 B1 * | 12/2002 | Retamal | B01F 3/088 | 366/132 |
| 6,533,449 B1 * | 3/2003 | Auad | B01F 3/088 | 366/132 |
| 6,994,464 B2 * | 2/2006 | Villwock | B01D 19/0052 | 366/136 |
| 7,537,446 B2 | 5/2009 | James et al. | | |
| 7,618,181 B2 * | 11/2009 | Hiraki | B01F 3/1221 | 241/101.8 |
| 7,913,940 B2 * | 3/2011 | Harmon | B09B 3/00 | 241/21 |
| 8,778,434 B2 * | 7/2014 | Federici | B01J 2/10 | 241/154 |
| 9,101,891 B2 | 8/2015 | Odagi | | |
| 9,550,311 B1 * | 1/2017 | Neel | B28C 7/02 | |
| 9,803,085 B2 * | 10/2017 | Flanigan | C08J 3/005 | |
| 9,951,224 B2 * | 4/2018 | Russell | C08L 95/00 | |
| 2001/0042717 A1 * | 11/2001 | Chioini | B01F 15/00155 | 210/646 |
| 2002/0006077 A1 * | 1/2002 | Yamazaki | B01F 1/00 | 366/149 |
| 2002/0034122 A1 * | 3/2002 | Lemke | B24B 37/04 | 366/136 |
| 2002/0057625 A1 * | 5/2002 | Russell | A61M 1/1656 | 366/136 |
| 2003/0081493 A1 * | 5/2003 | Allen | B01F 5/02 | 366/10 |
| 2003/0137895 A1 * | 7/2003 | Hummer | B01F 5/0218 | 366/137 |
| 2003/0170156 A1 * | 9/2003 | Kemp | B01F 3/0865 | 422/224 |
| 2004/0134930 A1 * | 7/2004 | Hiraki | B01F 3/1207 | 222/100 |
| 2004/0151062 A1 * | 8/2004 | Yao | B01F 5/102 | 366/137 |
| 2006/0228439 A1 * | 10/2006 | James | B01F 3/1271 | 425/542 |
| 2006/0249605 A1 * | 11/2006 | Hiraki | B01F 3/1221 | 241/21 |
| 2007/0030322 A1 * | 2/2007 | Lee | B01F 7/00766 | 347/88 |
| 2008/0223792 A1 * | 9/2008 | Woods | B01F 3/1228 | 210/727 |
| 2008/0290537 A1 * | 11/2008 | Bacher | B01F 7/18 | 264/37.1 |
| 2009/0003126 A1 * | 1/2009 | Hassan | B01F 7/00766 | 366/176.1 |
| 2009/0229491 A1 * | 9/2009 | Harmon | B09B 3/00 | 106/273.1 |

(56) References Cited

U.S. PATENT DOCUMENTS

| | | | | |
|---|---|---|---|---|
| 2009/0312872 | A1* | 12/2009 | Burris | C10C 3/04 700/265 |
| 2010/0064623 | A1* | 3/2010 | Sinclair | B28B 1/525 52/596 |
| 2010/0200500 | A1* | 8/2010 | Rezania | B01F 3/04099 210/614 |
| 2011/0196074 | A1* | 8/2011 | Flanigan | C08J 3/005 524/71 |
| 2011/0250264 | A1* | 10/2011 | Schutt | A61K 31/4458 424/450 |
| 2011/0283920 | A1* | 11/2011 | Barger | C04B 26/006 106/668 |
| 2013/0220175 | A1 | 8/2013 | Zickell | |
| 2014/0014000 | A1* | 1/2014 | Franzen | C08L 95/00 106/273.1 |
| 2014/0044485 | A1* | 2/2014 | Wallace | C09K 17/06 405/36 |
| 2015/0131403 | A1* | 5/2015 | Takaki | G05D 11/138 366/137 |
| 2015/0299466 | A1* | 10/2015 | Qiu | C08L 91/06 106/498 |
| 2016/0053119 | A1* | 2/2016 | Russell | C08L 95/00 106/273.1 |
| 2016/0090512 | A1* | 3/2016 | Humphreys | B01F 5/106 118/698 |
| 2017/0267864 | A1* | 9/2017 | Flanigan | C08J 3/005 |
| 2018/0201787 | A1* | 7/2018 | Russell | C08L 95/00 |
| 2018/0230309 | A1* | 8/2018 | Flanigan | C08J 3/005 |

FOREIGN PATENT DOCUMENTS

| | | | | |
|---|---|---|---|---|
| CA | 2905679 | * | 3/2016 | |
| CH | 590076 | A5 * | 7/1977 | ........... B01F 1/0016 |
| CN | 1733833 | | 2/2006 | |
| CN | 101629000 | | 1/2010 | |
| CN | 101767957 | | 7/2010 | |
| CN | 101885867 | | 11/2010 | |
| DE | 24 20 138 | | 11/1975 | |
| DE | 2420138 | A1 * | 11/1975 | ........... B01F 13/1011 |
| DE | 10119182 | A1 * | 10/2002 | ............. B01F 7/024 |
| DE | 10247865 | A1 * | 4/2004 | ............. A01K 5/0216 |
| DE | 102011012771 | A1 * | 9/2012 | ........... B01F 3/1214 |
| EP | 0363300 | A1 * | 4/1990 | ........... B01F 3/0811 |
| EP | 0 958 855 | | 11/1999 | |
| EP | 0958855 | A1 * | 11/1999 | ............. B01F 3/088 |
| EP | 1 813 360 | | 8/2007 | |
| EP | 2 832 433 | | 2/2015 | |
| EP | 2832433 | A1 * | 2/2015 | ............ B01F 5/0206 |
| FR | 683991 | A * | 6/1930 | ........... B01F 13/1027 |
| FR | 701135 | | 3/1931 | |
| FR | 701135 | A * | 3/1931 | ............ B01F 1/0022 |
| GB | 1480911 | A | 7/1977 | ............ B01F 1/0022 |
| GB | 2 087 247 | | 5/1982 | |
| GB | 2087247 | A * | 5/1982 | ........... B01F 3/1221 |
| RU | 2354623 | C1 | 5/2009 | |
| RU | 131737 | U1 | 8/2013 | |
| WO | WO-03086604 | A1 * | 10/2003 | ........ B01D 19/0052 |
| WO | WO 2007/045780 | | 4/2007 | |
| WO | WO-2007045780 | A2 * | 4/2007 | ............ B01F 3/1221 |
| WO | WO 2015/099625 | | 7/2015 | |

* cited by examiner

SYSTEM, METHOD, APPARATUS, MEANS, AND COMPUTER PROGRAM PRODUCT FOR RECYCLING ASPHALT SHINGLES

CROSS-REFERENCE TO RELATED APPLICATIONS

This application is a Divisional of U.S. patent application Ser. No. 14/826,458, filed Aug. 14, 2015 (now issued as U.S. Pat. No. 9,951,224), which claims priority from U.S. Provisional Patent Application No. 62/039,149, which was filed on Aug. 19, 2014. The disclosure of each of the referenced applications is hereby incorporated herein in its entirety by reference.

FIELD OF THE DISCLOSURE

The present disclosure relates to recycling asphalt shingles. More particularly, the present disclosure relates to systems, methods, apparatuses, means, and computer program products for recycling asphalt shingles. The resultant asphalt mix output may be suitable for use as asphalt pavement or other asphalt based products.

BACKGROUND

Certain embodiments of shingles are formed from asphalt. Asphalt shingles may be removed during the replacement of a roof. The removed asphalt shingles may be discarded. More preferably the asphalt shingles may be recycled. For example, the recycled asphalt shingles may be recycled to form asphalt pavement. However, certain existing embodiments of methods for recycling asphalt shingles may insufficiently process the asphalt shingles such that chunks of the asphalt shingles undesirably remain in the resultant asphalt pavement. Accordingly, it would be desirable to more completely process asphalt shingles during recycling thereof to produce an asphalt mix output more suitable for usage as asphalt pavement.

SUMMARY OF THE DISCLOSURE

Embodiments of the present disclosure relate to recycling asphalt shingles for usage in asphalt pavement. The asphalt shingles may be melted and mixed with a fluid asphalt input in a preliminary mixing unit. This molten asphalt may then be directed to a primary mixing unit, at which the molten asphalt is mixed with an aggregate material and/or a recycled pavement material to form an asphalt mix output that is relatively low in, or substantially free of, solid chunks of asphalt shingles and suitable for usage as asphalt pavement.

In one aspect a method for producing asphalt mix is provided. The method may include mixing and heating a fluid asphalt input and an asphalt shingle input in a preliminary mixing unit to melt the asphalt shingle input and produce a molten asphalt. Additionally, the method may include directing the molten asphalt and a particulate input into a primary mixing unit. The method may further include mixing the molten asphalt with the particulate input to produce an asphalt mix output.

In some embodiments the method may additionally include directing a recycled asphalt input into the primary mixing unit. Further, the method may include mixing the recycled asphalt input with the molten asphalt and the particulate input to produce the asphalt mix output. The method may also include directing the molten asphalt through a strainer prior to directing the molten asphalt into the primary mixing unit.

In some embodiments the method may further include directing the molten asphalt to an intermediate tank before directing the molten asphalt into the primary mixing unit. Additionally, the method may include directing the fluid asphalt input to a bottom of the preliminary mixing unit. Further, the method may include grinding a plurality of asphalt shingles to produce the asphalt shingle input. The method may additionally include recirculating the molten asphalt at the preliminary mixing unit.

In an additional aspect a preliminary mixing unit for asphalt is provided. The preliminary mixing unit may include a tank. Further, the preliminary mixing unit may include a first inlet port connected to the tank and configured to receive an asphalt shingle input. The preliminary mixing unit may additionally include a second inlet port connected to the tank and configured to receive a fluid asphalt input. The preliminary mixing unit may further include a heater configured to heat the asphalt shingle input and the fluid asphalt input in the tank. The preliminary mixing unit may additionally include a mixer configured to mix the asphalt shingle input and the fluid asphalt input in the tank and melt the asphalt shingle input to produce a molten asphalt. The preliminary mixing unit may further include an outlet port configured to output the molten asphalt.

In some embodiments the preliminary mixing unit may further comprise a recirculation loop configured to recirculate the molten asphalt received from the outlet port. Additionally, the preliminary mixing unit may include a valve configured to selectively direct the molten asphalt through the recirculation loop. The preliminary mixing unit may further include a strainer positioned downstream of the outlet port. The second inlet port may be positioned proximate a bottom of the tank.

In an additional aspect a system for producing asphalt mix is provided. The system may include a preliminary mixing unit configured to receive an asphalt shingle input and a fluid asphalt input and output a molten asphalt. Further, the system may include a primary mixing unit configured to mix the molten asphalt with a particulate input to produce an asphalt mix output.

In some embodiments the primary mixing unit may be further configured to receive a recycled asphalt input and mix the recycled asphalt input with the molten asphalt and the particulate input to produce the asphalt mix output. The system may further include a strainer positioned downstream of the preliminary mixing unit and upstream of the primary mixing unit and configured to filter the molten asphalt. The system may additionally include an intermediate tank positioned downstream of the preliminary mixing unit and upstream of the primary mixing unit and configured to store the molten asphalt.

In some embodiments the system may also include a grinder configured to grind a plurality of asphalt shingles to produce the asphalt shingle input. The system may further include a recirculation loop configured to recirculate the molten asphalt at the preliminary mixing unit. The preliminary mixing unit may include a tank and a first inlet port configured to discharge the asphalt shingle input proximate a top of the tank. The preliminary mixing unit may further include a second inlet port configured to direct the fluid asphalt input to a nozzle positioned proximate a bottom of the tank.

These and other features, aspects, and advantages of the disclosure will be apparent from a reading of the following detailed description together with the accompanying drawings, which are briefly described below.

BRIEF DESCRIPTION OF THE DRAWINGS

In order to assist the understanding of embodiments of the disclosure, reference will now be made to the appended drawings, which are not necessarily drawn to scale. The drawings are exemplary only, and should not be construed as limiting the disclosure.

DETAILED DESCRIPTION OF THE PREFERRED EMBODIMENTS

The present disclosure now will be described more fully hereinafter with reference to the accompanying drawings. The disclosure may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural references unless the context clearly dictates otherwise.

Figure 1:
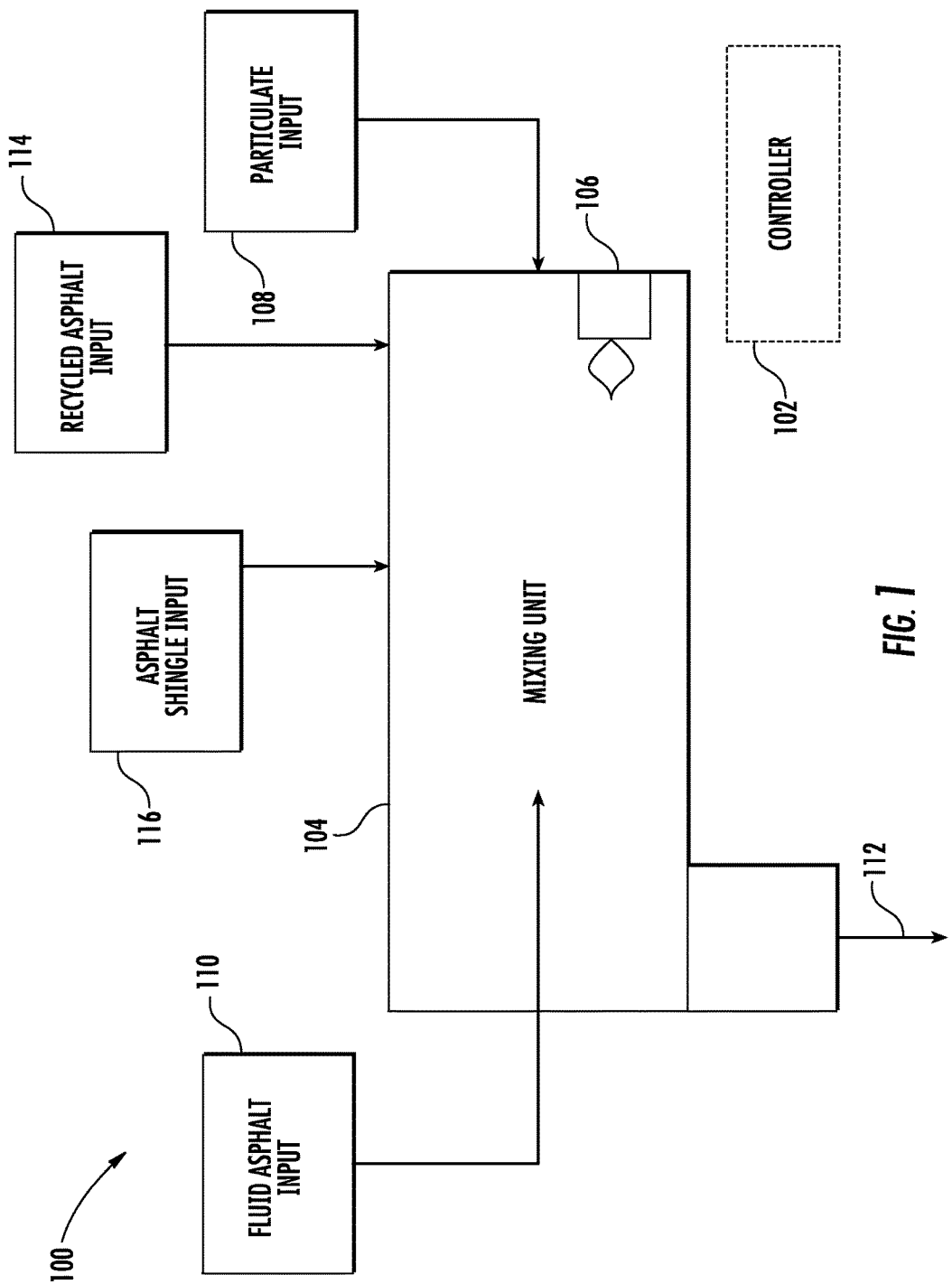
FIG. 1 schematically illustrates a system for producing asphalt mix including a mixing unit according to a first example embodiment of the present disclosure.

As described herein, embodiments of the disclosure relate to producing an asphalt mix from recycled asphalt shingles. In this regard, FIG. 1 illustrates a first embodiment of a system 100 for producing an asphalt mix output. The system 100 may be controlled by a controller 102 configured to control some or all of the operations described below. In some embodiments the controller 102 may comprise a programmable logic controller. Note that although the controller 102 is illustrated as a single, unitary device, in some embodiments the controller may be distributed across multiple separate devices that may separately or jointly control operation of various portions of the system 100.

As illustrated, the system 100 may further include a mixing unit 104 (e.g. a drum mixer). The mixing unit 104 may include a mixer configured to mix a plurality of inputs. In some embodiments the primary mixing unit 204 may be employed in traditional asphalt mix production by combing a fluid asphalt input with the particulate input. Note that although use of a plurality of inputs are described below, fewer inputs or a greater number of inputs of the same or differing types may be employed in other embodiments. Further, the mixing unit 104 may be configured to heat the inputs. Thus, the mixing unit 104 may include a heater 106 that heats and dries the various inputs directed into the mixing unit. In this regard, production of asphalt ideally minimizes the water content therein to the greatest extent possible.

The mixing unit 104 may be configured to receive a particulate input 108. The particulate input 108 may include a degree of moisture (e.g., due to being stored outdoors), which may be lessened by the heater 106. The particulate input 108 may comprise sand, gravel, crushed stone, slag, recycled concrete, aggregates (geosynthetic aggregates), and/or any other particulate materials.

Further, the mixing unit 104 may be configured to receive a fluid asphalt input 110. The fluid asphalt input 110, also referred to as bitumen, is a black and highly viscous fluid form of petroleum. Thereby, the mixing unit 104 may mix the particulate input 108 with the fluid asphalt input 110 to form an asphalt mix output 112, which may be delivered to a desired location and laid as asphalt pavement.

Use of recycled materials in the production of asphalt may be desirable in some embodiments. In this regard, certain asphalt-containing materials may be recycled to produce asphalt. Thus, for example, in some embodiments a recycled asphalt input 114 may be directed into the mixing unit 104. The recycled asphalt input 114 may comprise recycled asphalt pavement.

Further, some embodiments of shingles are formed from asphalt. Accordingly, the mixing unit 104 may be additionally or alternatively configured to receive an asphalt shingle input 116. The asphalt shingle input 116 may be provided as a plurality solids, rather than in a liquid form. The asphalt shingle input 116 may comprise used asphalt shingles or scraps or rejects from asphalt shingle production, or any other embodiment of asphalt shingles. Note also that although the present systems are particularly described herein as being configured to produce an asphalt mix output from asphalt shingles, various other asphalt-containing materials may be additionally or alternatively employed to form the asphalt mix output in accordance with embodiments of the present disclosure. The asphalt shingles and scrapes may be ground in a grinder or otherwise processed to produce pieces of asphalt shingles defining a relatively smaller size, which are employed as the asphalt shingle input 116. Further, nails and other debris may be removed from the asphalt shingles during processing to produce the asphalt shingle input 116.

However, production of the asphalt mix output 112 may not sufficiently process the asphalt shingle input 116 to a desired extent. In this regard, despite grinding the asphalt shingles prior to introduction into the mixing unit 104, the asphalt shingles may not melt sufficiently to fully liquefy therein. In this regard, the asphalt included in asphalt shingles is typically much more stiff than asphalt binders included in the fluid asphalt input 110 typically employed to form asphalt pavement, and hence much more difficult to melt as a result. Accordingly, the asphalt mix output 112 may undesirably include solid chunks of asphalt shingles therein. The inclusion of solid asphalt pieces may cause the asphalt mix output 112 to fail to meet specifications required or desired for usage as asphalt pavement. In this regard, the solid asphalt pieces may cause the paving process to suffer from challenges in terms of forming a smooth surface and/or the pavement may suffer from premature wear and failure as a result of the asphalt shingle pieces loosening over time and/or failing to bind with the surrounding asphalt and aggregate.

Figure 2:
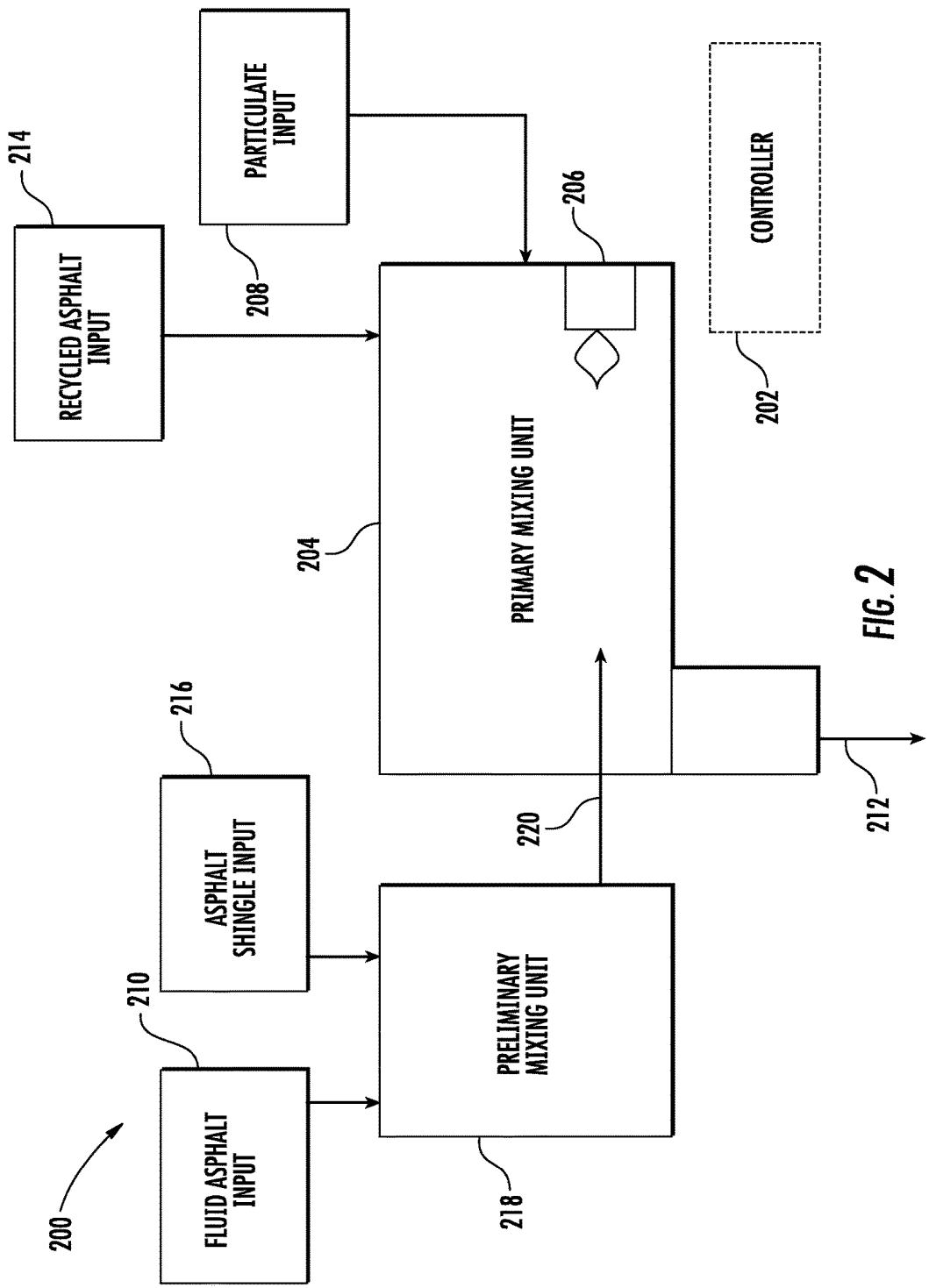
FIG. 2 schematically illustrates a system for producing asphalt mix including a preliminary mixing unit and a primary mixing unit according to an additional example embodiment of the present disclosure.

Accordingly, FIG. 2 illustrates a second embodiment of a system 200 for producing an asphalt mix output. The system 200 may be controlled by a controller 202 configured to control some or all of the operations described below. In some embodiments the controller 202 may comprise a programmable logic controller (PLC). Note that although the controller 202 is illustrated as a single, unitary device, in some embodiments the controller may be distributed across multiple separate devices that may separately or jointly control operation of various portions of the system 200.

As illustrated, the system 200 may include a mixing unit 204 (e.g. a drum mixer), which may also be referred to as a primary mixing unit. The primary mixing unit 204 may include a mixer configured to mix a plurality of inputs. Note that although use of a plurality of inputs are described below, fewer inputs or a greater number of inputs of the same or differing types may be employed in other embodiments. Further, the primary mixing unit 204 may be configured to heat the inputs. Thus, the primary mixing unit 204 may include a heater 206 (e.g., an electric coil, a burner, a boiler, circulating hot fluid (e.g., oil or steam) that surrounds the tank, or any other embodiment of heat producer) that heats and dries the various inputs directed into the primary mixing unit 204. In this regard, production of asphalt ideally minimizes the water content therein to the greatest extent possible.

The primary mixing unit 204 may be configured to receive a particulate input 208. The particulate input 208 may include a degree of moisture (e.g., due to being stored outdoors), which may be lessened by the heater 206. The particulate input 208 may comprise sand, gravel, crushed stone, slag, recycled concrete, aggregates (e.g., geosynthetic aggregates), and/or any other particulate materials.

Use of recycled materials in the production of asphalt may be desirable in some embodiments. In this regard, certain asphalt-containing materials may be recycled to produce asphalt. Thus, for example, in some embodiments a recycled asphalt input 214 may be directed into the primary mixing unit 204. The recycled asphalt input 214 may comprise recycled asphalt pavement.

Further, the primary mixing unit 204 may be configured to receive a fluid asphalt input 210. The fluid asphalt input 210, also referred to as bitumen or a fluid asphalt binder, is black and highly viscous fluid form of petroleum. Further, the primary mixing unit 204 may be configured to receive an asphalt shingle input 216. The asphalt shingle input 216 may comprise used asphalt shingles or scraps or rejects from asphalt shingle production, or any other embodiment of asphalt shingles. Note also that although the present systems are particularly described herein as being configured to produce an asphalt mix output from asphalt shingles, various other asphalt-containing materials may be additionally or alternatively employed to form the asphalt mix output in accordance with embodiments of the present disclosure. The asphalt shingles and scrapes may be ground in a grinder or otherwise processed to produce pieces of asphalt shingles defining a relatively smaller size, which are employed as the asphalt shingle input 216. Further, nails and other debris may be removed from the asphalt shingles during processing to produce the asphalt shingle input 216.

In the embodiment of a system 100 described above with reference to FIG. 1, fluid asphalt and asphalt shingle inputs are directly inputted to the mixing unit. However, as noted above, this configuration may result in the asphalt mix output undesirably including solid chunks of shingles or other solid recycled asphalt-containing materials. Accordingly, the system 200 illustrated in FIG. 2 is configured to minimize the existence of any solid chunks of shingles or other solid recycled asphalt-containing materials in the asphalt mix output.

In this regard, the system 200 may further include a preliminary mixing unit 218 including a mixer. The preliminary mixing unit 218 may be configured to receive and mix a fluid asphalt input 210 and an asphalt shingle input 216, which may be substantially similar to the fluid asphalt input 110 and the asphalt shingle input 116 described above. Accordingly, heat from the fluid asphalt input 210 and the mixing action from the preliminary mixing unit 218 may substantially entirely melt the asphalt shingle input 216. Thereby, the preliminary mixing unit 218 may output a molten asphalt 220 to a primary mixing unit 204. Accordingly, rather than directing the asphalt shingle input 216 directly to the primary mixing unit 204, the asphalt shingle input may be melted through mixing with the hot fluid asphalt input 210 in the preliminary mixing unit 218. Further, the system 200 may be configured to retain the molten asphalt 220 in fluid form during transport and introduction into the primary mixing unit 204 such that issues with respect to the asphalt from the shingles resolidifying and hampering mixing at the primary mixing unit may be avoided.

The primary mixing unit 204 may receive the molten asphalt 220 and combine it with a particulate input 208 and/or a recycled asphalt input 214, which may be substantially similar to the particulate input 108 and the recycled asphalt input 214 described above, and which may be heated and mixed therein to form an asphalt mix output 212 suitable for use as an asphalt pavement. A controller 202, which may be substantially similar to the controller 102, may be employed to control the operations of the various components of the system 200.

As a result of the solid chunks of shingles being substantially removed by mixing and melting the asphalt shingle input 216 with the fluid asphalt input 210, the asphalt mix output 212 may also be substantially free of chunks of asphalt shingles. Thereby, the preliminary step of melting the asphalt shingle input 216 in the preliminary mixing unit 218 may reduce or remove issues with respect to the asphalt mix output 212 including solid chunks of shingles. Accordingly, the asphalt mix output 212 may define a quality substantially equal to that of asphalt mix which does not include asphalt shingles, whereas asphalt mix produced without the preliminary melting step may define a relatively inferior quality, as described above. Thus, issues with respect to employing recycled asphalt shingles in asphalt mix may be substantially avoided, while allowing for production of a relatively cheaper (e.g., due to the relatively inexpensive price of used shingles) and more environmentally conscious asphalt mix output.

Figure 3:
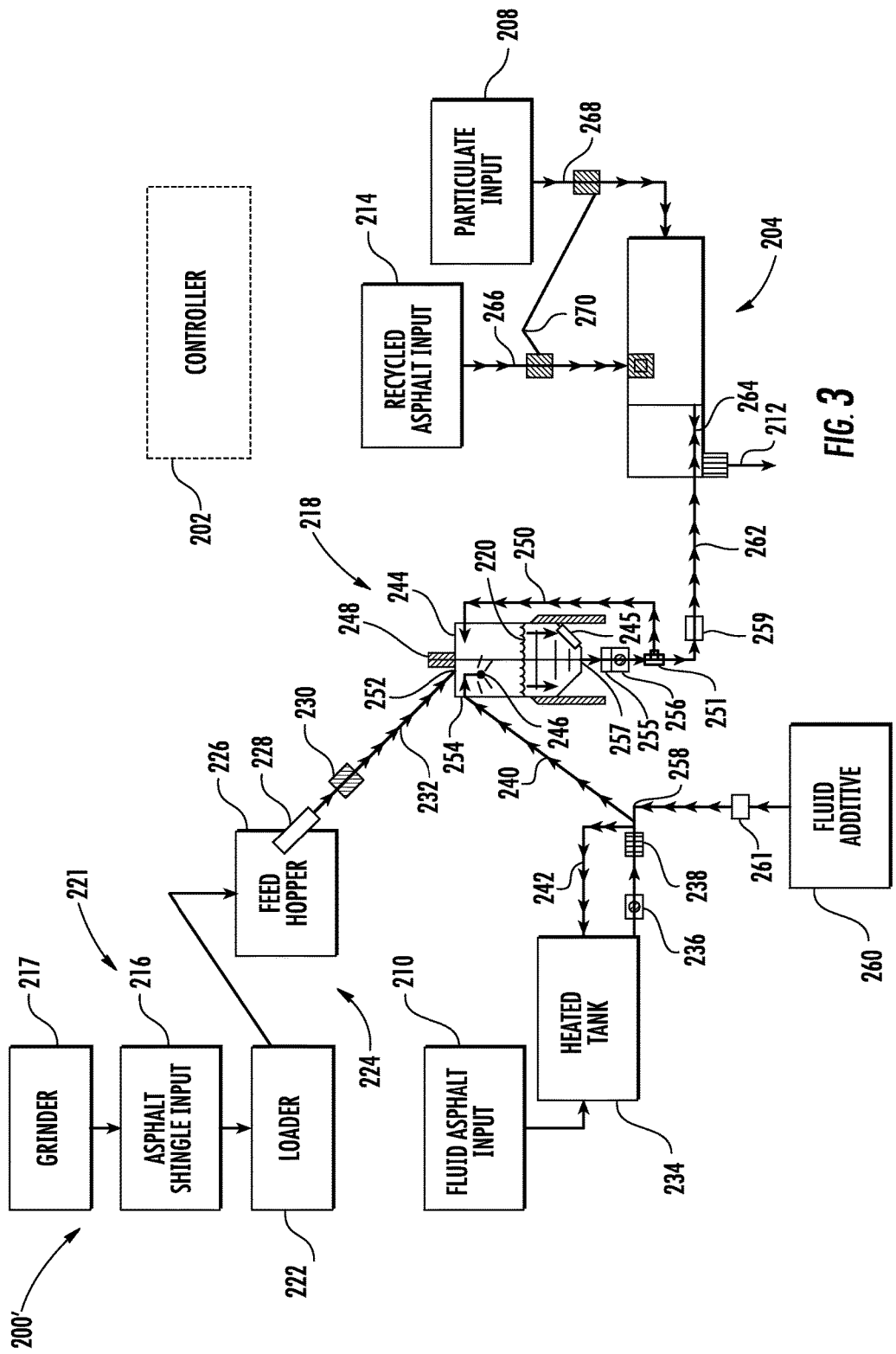
FIG. 3 schematically illustrates the system of FIG. 2 including additional components according to an example embodiment of the present disclosure.

FIG. 3 illustrates an embodiment of a system 200' that is substantially similar to the system 200 illustrated in FIG. 2. However, FIG. 3 illustrates additional details and components that may be included in the system. Note that the description of the system 200' in some instances below includes alternate terminology that may more particularly describe the components and operation of the system 200'.

As variously described above with respect to FIG. 2, the present disclosure provides a system, method, means, computer program product, and apparatus to wet process the asphalt shingle input 216 with the fluid asphalt input 210 of various grades. The wet process refers to wetting the asphalt shingle input 216 materials with the hot fluid asphalt input 210, in a separate process, prior to entering the primary mixing unit 204. This process provides a stream of materials, integrated with existing asphalt plant mix components by means of the controller 202. The molten asphalt 220 produced from the fluid asphalt input 210 and the asphalt shingle input 216 can be well regulated and metered (e.g., due to the fluid state thereof) and provides a better means of activating the residual asphalt binder contained in the asphalt shingle input for use in asphalt pavement construction.

As noted above, the residual asphalt contained in the asphalt shingle input 216 is often much harder/stiffer than typical paving grades of asphalt binders. This makes the residual asphalt, which generally has a range of about 15-22% in each of the shingles, much more difficult to activate or melt and make usable for mixing in a primary mixing unit. Accordingly, as described above, directing solid pieces of the asphalt shingle input 216 directly into a mixing unit (e.g., as described above with respect to the system 100 illustrated in FIG. 1) may not fully melt the asphalt shingle input, resulting in chunks of the asphalt shingles remaining in the resultant asphalt mix output. However, as additionally described above, wetting and mixing the asphalt shingle input 216 in a separate process with the hot fluid asphalt input 210 prior to entering the primary mixing unit 204 significantly aides in the activation, melting and dispersion of the residual asphalt in the asphalt shingle input for use in asphalt pavement mixtures.

The asphalt shingle input 216 may be produced by a grinder 217 that performs a crushing or grinding process on asphalt shingles as needed based on production and availability to a desired particle size (e.g., to maximum dimensions from about 1/8" to about 1", and preferably to maximum dimensions from about 1/4" to about 3/8"), cleaned of nails and other debris, and stockpiled to meet agency specifications. The processed asphalt shingle input 216 is generally stored in a stockpile 221 at the mix plant site, on a well-drained area and/or covered to minimize the moisture content. The stockpile 221 of the asphalt shingle input 216 may be tested prior to use in mix production for residual asphalt content, aggregate gradation, and moisture content. The asphalt shingle input 216 may be fed by a loader 222 or other piece of equipment to a feed system 224. The feed system 224 (and any of the other apparatuses described herein) may be interlocked with other plant components and controlled by the controller 202. The feed system 224 may include a feed hopper 226, which may be equipped with a variable frequency drive (VFD) motor 228, a strainer 230 (e.g., comprising one or more screens), and one or more conveyors 232 (e.g., comprising an auger). The feed system 224 may be calibrated to regulate flow of the asphalt shingle input 216 to the preliminary mixing unit 218, as controlled by the controller 202, and may account for moisture content, residual asphalt content, mixture production rates, and the percentage of the total asphalt mixture to be defined by the asphalt shingle input.

The fluid asphalt input 210 may be stored in a heated tank 234, which may be positioned adjacent the preliminary mixing unit 218. The temperature in the heated tank 234 may be regulated (e.g., by the controller 202) to maintain a desired temperature generally between 200-450 degrees Fahrenheit depending on the type and grade of the fluid asphalt input 210 being used. A pump 236, which may be equipped with a VFD motor, may be controlled and interlocked to other plant components by means of the controller 202. The pump 236 may be configured to supply the fluid asphalt input 210 to the preliminary mixing unit 218. The fluid asphalt input 210 may be metered to the preliminary mixing unit 218 by the pump 236, as controlled by the controller 202 and metered by an flow meter 238, and regulated based on aggregate moisture content, production rates, residual asphalt content, and the percentage of the total asphalt mixture to be defined by the asphalt shingle input 216. One or more heated injection lines 240 (e.g., one or more conduits) and valves may be used and the fluid asphalt input 210 can be recirculated through a heated recirculation loop 242 in order to allow for even heating and mixing of the fluid asphalt.

The preliminary mixing unit 218 may be separate and positioned upstream of the primary mixing unit 204. The preliminary mixing unit 218 may comprise a tank 244, which may be sized to match the plant production and heated and insulated. A heater 245 (e.g., an electric coil, a burner, circulating hot oil or steam that surrounds the tank, or any other embodiment of heat producer) may heat the tank 244 and the materials received therein. Further, the preliminary mixing unit 218 may include a nozzle 246 (e.g., one or more asphalt spray nozzles), a mixer 248 which may comprise one or more blades, a heated recirculation loop 250 (which may be configured to evenly heat and mix the asphalt shingle input 216 with the fluid asphalt input 210 by recirculating the molten asphalt 220 received from the nozzle 246 to ensure that the asphalt shingle input completely melts), a valve 251 configured to selectively direct the molten asphalt through the recirculation loop, an asphalt shingle input inlet port 252 (e.g., a first inlet port) configured to receive the asphalt shingle input from the conveyor 232, a fluid asphalt inlet port 254 (e.g., a second inlet port) configured to receive the fluid asphalt input from the heated injection line 240, a strainer 255 positioned downstream of the outlet port 257 and configured to receive the molten asphalt 220 and remove particulates larger than a predetermined size, a pump 256 (e.g., a VFD direct drive pump) configured to receive the molten asphalt after it flows through the strainer, a flow meter 259 (which may be included in, or separate from, the pump 256), a fluid additive/anti-strip inlet 258, and associated temperature gauges, level sensors, and valves. The strainer 255 may be positioned upstream of the pump 256 and configured to protect the pump by filtering out large particulate (e.g., stones) which may otherwise damage the pump, and which may commonly appear in the asphalt shingle input 216 as a result of it comprising recycled materials which may be produced under relatively less controlled conditions as compared to virgin inputs. Further, the tank 244 may be covered (e.g., by a lid) so as to prevent water entry therein.

As noted above, the preliminary mixing unit 218 may include the inlet port 254, which is in communication with the heated injection line 240. The fluid asphalt input 210 may thus be received through the inlet port 254 from the heated injection line 240 and injected through the nozzle 246 in the tank 244. If applicable, a fluid additive (e.g., an anti-strip agent) 260 may be blended with the fluid asphalt input 210 by means of a pump 261 (e.g., a VFD pump), which may be controlled by the controller 202. Further, the asphalt shingle input 216 may be introduced to the top of the preliminary mixing unit 218 by the conveyor 232 through the inlet port 252. The asphalt shingle input 216 may be wetted with hot fluid asphalt input 210 sprayed thereon and/or pooled at the bottom of the tank 244 as it falls into the tank. The hot fluid asphalt input 210 may begin to remove moisture from the asphalt shingle input 216, thereby creating a slight foaming action, while also beginning to activate/melt the residual binder in the asphalt shingle input. The mixture of the asphalt shingle input 216 and the fluid asphalt input 210 has a dwell time in the preliminary mixing unit 218, where it is continuously agitated by the mixer 248, to thereby remove moisture from the asphalt shingle input, activate the residual asphalt, and prevent precipitation of solids after the asphalt shingle input is melted.

The molten asphalt 220 comprising the asphalt shingle input 216 and the fluid asphalt input 210 in proper proportion is then pumped to the primary mixing unit 204 through a heated injection line 262 and a nozzle 264 (e.g., a spray nozzle), where it may be mixed with the particulate input 208 and/or the recycled asphalt input 214. In this regard, the recycled asphalt input 214 may be supplied by a feed system 266 and the particulate input 208 may be supplied by a feed system 268. Belt scales 270 may be employed to dispense the desired quantity of the recycled asphalt input 214 and the particulate input 208 into the primary mixing unit 204. These systems may be interlocked and controlled by the controller 202 to account for total moisture content, recycled asphalt content, recycled asphalt aggregate gradation, recycled shingle content, recycled shingle aggregate gradation, particulate aggregate gradation, and the percentages of the total asphalt mixture to be defined by the molten asphalt 220, the recycled asphalt input 214, and the particulate input 208. The preliminary mixing unit 218 provides wetting and agitation in an interlocked and continual process scaled to match plant production separate from and upstream of the primary mixing unit 204, to provide the asphalt shingle input 216 time to activate and be more properly dispersed for use in producing the asphalt mix output 212.

Example embodiments of methods for starting up and shutting down the systems 200, 200' of FIGS. 2 and 3 are provided below. As may be understood, some or all of these operations may be directed or controlled by the controller 202.

Start-up of the mix system 200, 200' may involve the following: Run the preliminary mixing unit 218, the conveyor 232, and the pump 236 for the fluid asphalt input 210 in the heated recirculation loop 242. The loader 222 feeds the asphalt shingle input 216 from the stockpile 221 to the feed system 224. Start up the other system components including, for example, the primary mixing unit 204 and the feed systems 266, 268 for the recycled asphalt input 214 and the particulate input 208.

Close the heated recirculation loop 242, and begin pumping the hot fluid asphalt input 210 through the asphalt flow meter 238 and heated injection line 240 to the nozzle 246 at the preliminary mixing unit 218, properly timed and interlocked with other system components. Start the motor 228 for the feed system 224 for the asphalt shingle input 216 such that the strainer 230 removes oversized particles. The conveyor 232 begins feeding the asphalt shingle input 216 to the preliminary mixing unit 218.

The asphalt shingle input 216 is wetted by the hot fluid asphalt input 210 from the nozzle 246 and is mixed by the mixer 248. The pump 256 is started at proper sequence time, and pumps the molten asphalt 220 through the heated recirculation loop 250. At the proper sequence time the heated recirculation loop 250 is closed and the heated injection line 262 is opened such that the molten asphalt 220 is pumped and metered to the nozzle 264 in the primary mixing unit 204. The controller 202 controls mix plant production and properly proportions materials to compensate for: particulate input gradation, particulate input moisture content, recycled asphalt input gradation, recycled asphalt input residual asphalt content, recycled asphalt input moisture content, asphalt shingle input gradation, asphalt shingle input residual asphalt content, asphalt shingle input moisture content, desired mixture blend content of the inputs, total fluid asphalt content desired, and the production rate.

Shut-down of the mix system 200, 200' may involve the following: Shut off the feed system 224. Continue running the feed system conveyor 232 to clean it out. The asphalt pump 236 speeds up to account for loss of residual asphalt from the asphalt shingle input 216. The hot fluid asphalt input 210 continues to spray into the preliminary mixing unit 218 through the heated injection line 240 and the nozzle 246 to flush the remaining asphalt shingle input 216 through the system and the pump 256 continues to pump/meter material to the primary mixing unit 204. The other plant components are shut down in the proper timed sequence. Additionally, the preliminary mixing unit 218 is emptied. The pumps 236, 256 are run in reverse to clean out any remaining asphalt from the heated injection lines 240, 262.

Figure 4:
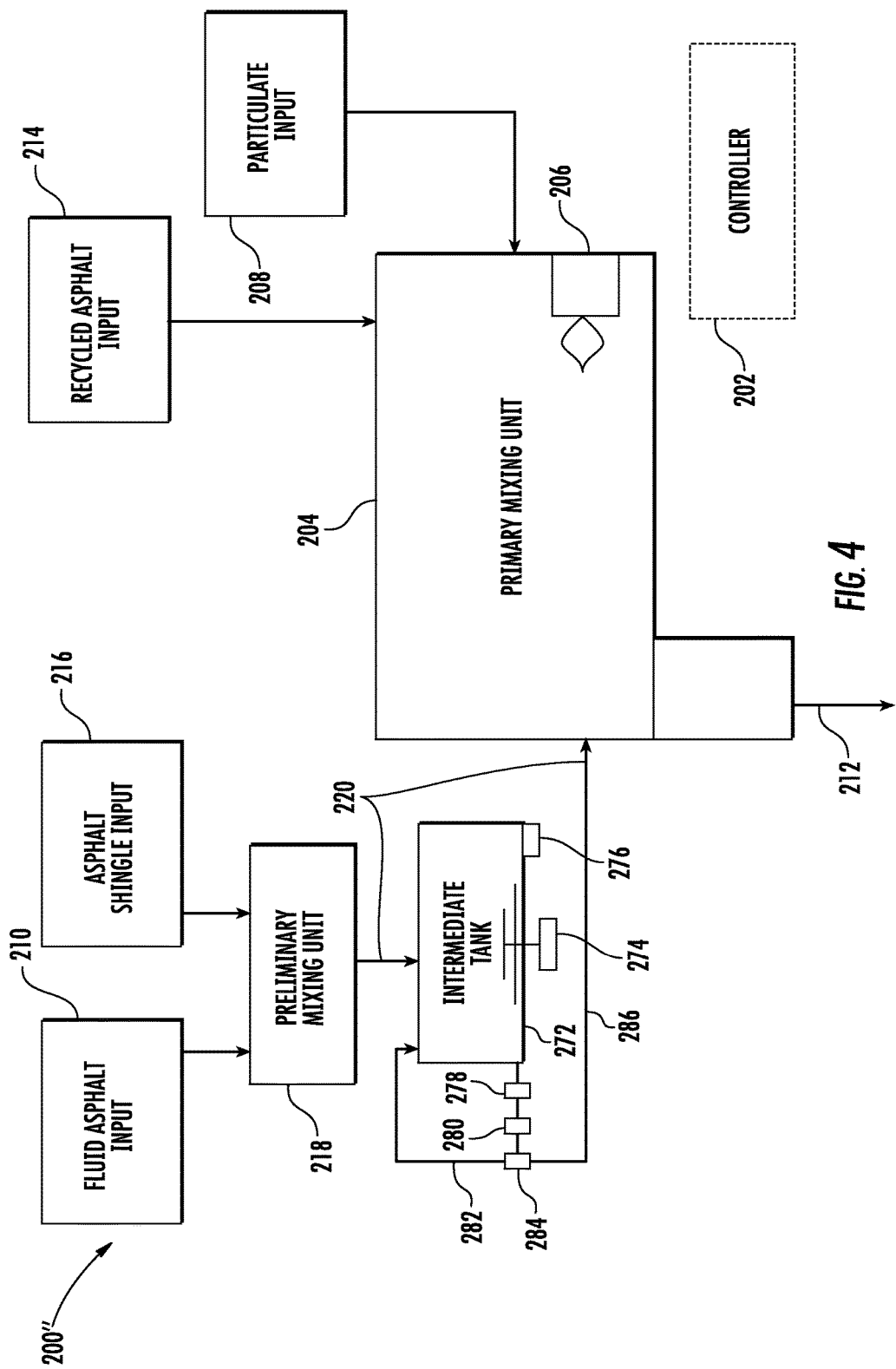
FIG. 4 schematically illustrates the system of FIG. 2 further including an intermediate tank according to an example embodiment of the present disclosure.

FIG. 4 schematically illustrates an additional embodiment of the system 200" that is substantially similar to the system 200 illustrated in FIG. 2 and which may include any of the additional components of the system 200' of FIG. 3. However, as illustrated, the system 200" may further comprise an intermediate tank 272. The intermediate tank 272 may be positioned downstream of the preliminary mixing unit 218 and upstream of the primary mixing unit 204. The intermediate tank 272 may be configured to store the molten asphalt 220 prior to directing the molten asphalt to the primary mixing unit 204.

In this regard, the quantity of the molten asphalt 220 produced in the preliminary mixing unit 218 may be less than the amount needed or desired for usage of the primary mixing unit 204. Accordingly, the intermediate tank 272 may be configured to receive and store the molten asphalt 220 until a sufficient quantity thereof is received from the preliminary mixing unit 218 and/or until the primary mixing unit 204 is ready for receipt of the molten asphalt 220. In some embodiments the intermediate tank 272 may include a mixer 274, which may agitate the molten asphalt 220 to prevent precipitation of solids out of the molten asphalt. Thus, in some embodiments the intermediate tank 272 may be referred to as an intermediate mixing unit.

Further, in some embodiments the intermediate tank 272 may include a heater 276 (e.g., an electric coil, a burner, circulating hot oil or steam that surrounds the tank, or any other embodiment of heat producer). The heater 276 may apply heat to the molten asphalt 220 to retain the fluidity thereof. Further, the intermediate tank 272 may include a screen 278, which may remove any remaining particulates, a pump 280 to discharge the molten asphalt 220 from the intermediate tank 272, a recirculation loop 282 configured to recirculate the molten asphalt 220, and a valve 284 configured to selectively direct the molten asphalt to the recirculation loop and/or through a heated injection line 286 to the primary mixing unit 204.

Figure 5:
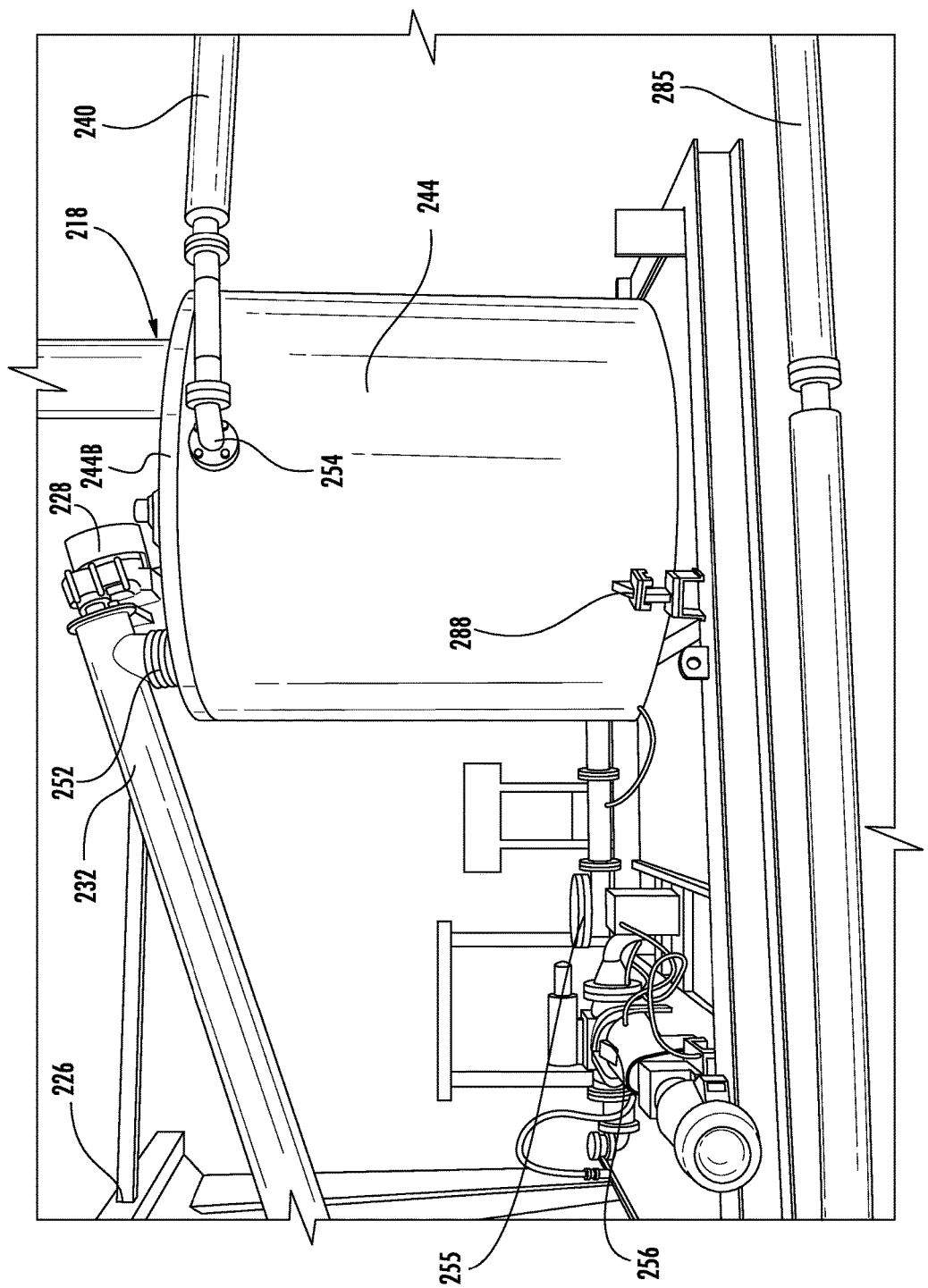
FIG. 5 illustrates the preliminary mixing unit of the system of FIGS. 2-4 according to an example embodiment of the present disclosure.
Figure 6:
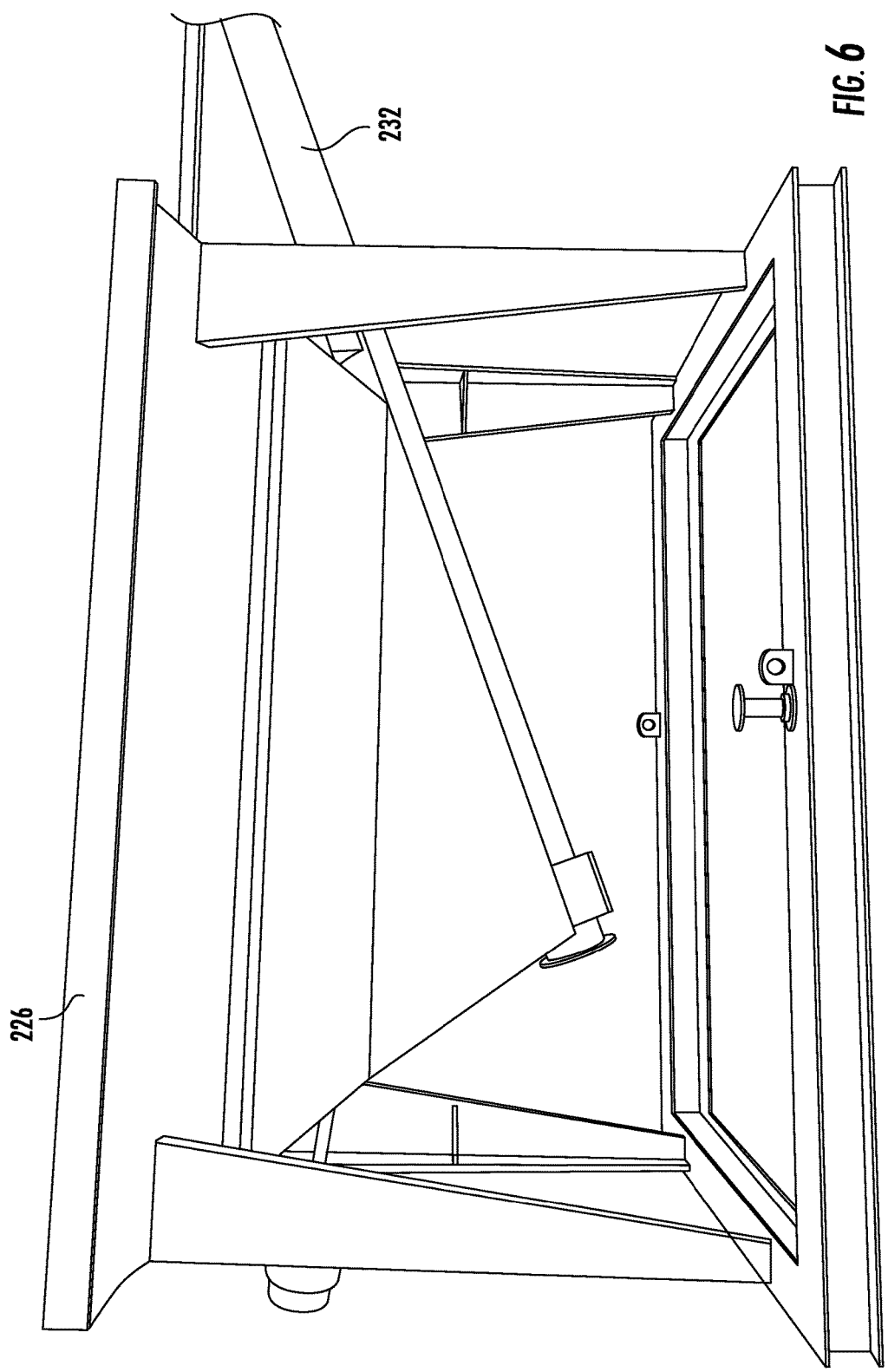
FIG. 6 illustrates a side view of a feed hopper of the system of FIGS. 2-4 according to an example embodiment of the present disclosure.
Figure 7:
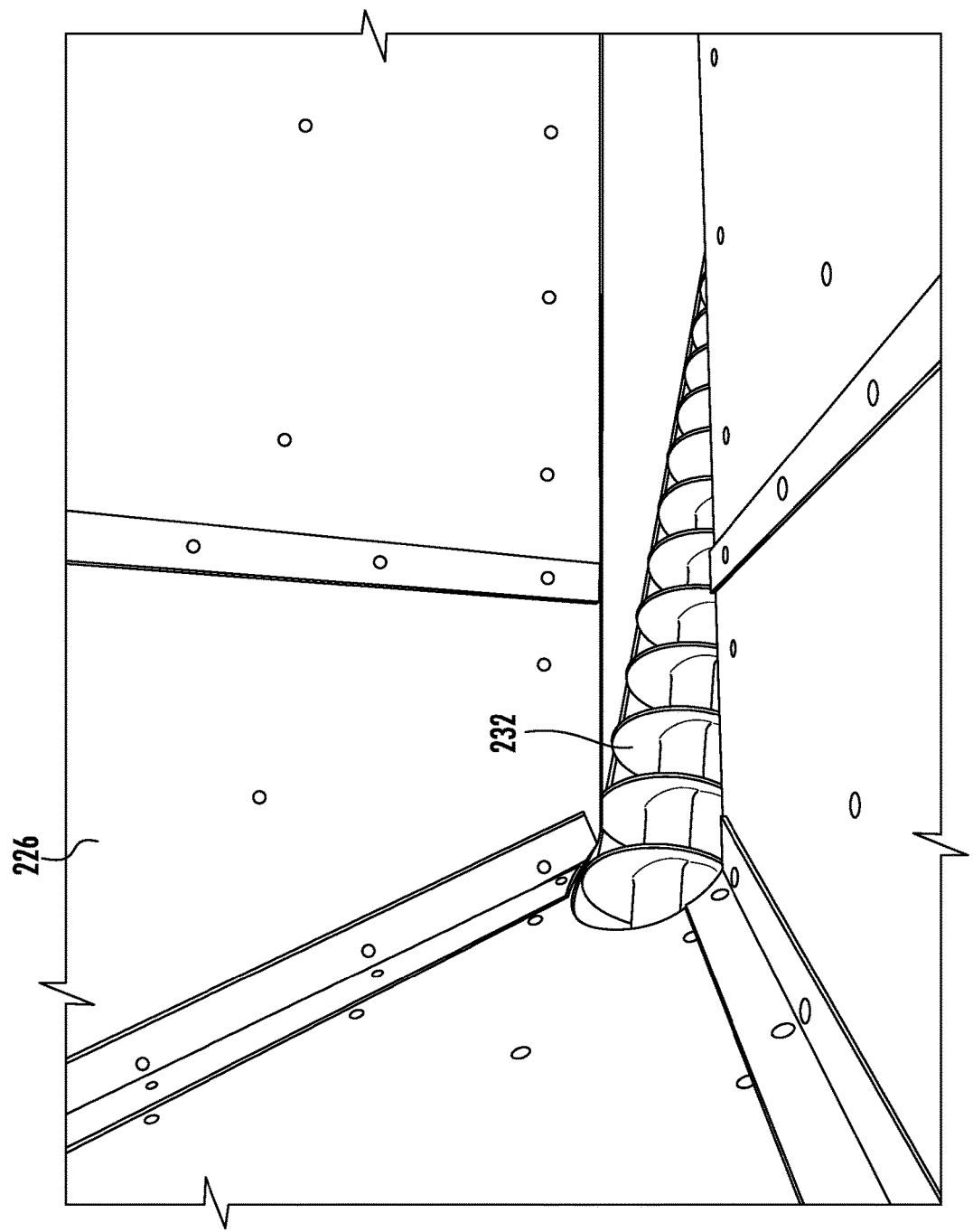
FIG. 7 illustrates a partial top view of the feed hopper of FIG. 6 according to an example embodiment of the present disclosure.

FIGS. 5-12 illustrate example embodiments and configurations of certain components of the systems 200, 200', 200" described above. As may be understood, such components are illustrated by way of example only, and such components may be configured in various manners in other embodiments. However, by way of example, FIG. 5 illustrates the preliminary mixing unit 218. FIG. 5 further illustrates the feed hopper 226 and the conveyor 232 (e.g., an auger) leading to the asphalt shingle input inlet port 252. A side view of the feed hopper 226 is provided in FIG. 6. An internal view of the top of the feed hopper 226 is illustrated in FIG. 7. As illustrated therein, the conveyor 232 may comprise a rotating auger that transports the asphalt shingle input 216 (see, e.g., FIG. 3) generally to the left in terms of the orientation illustrated in FIG. 7.

Figure 8:
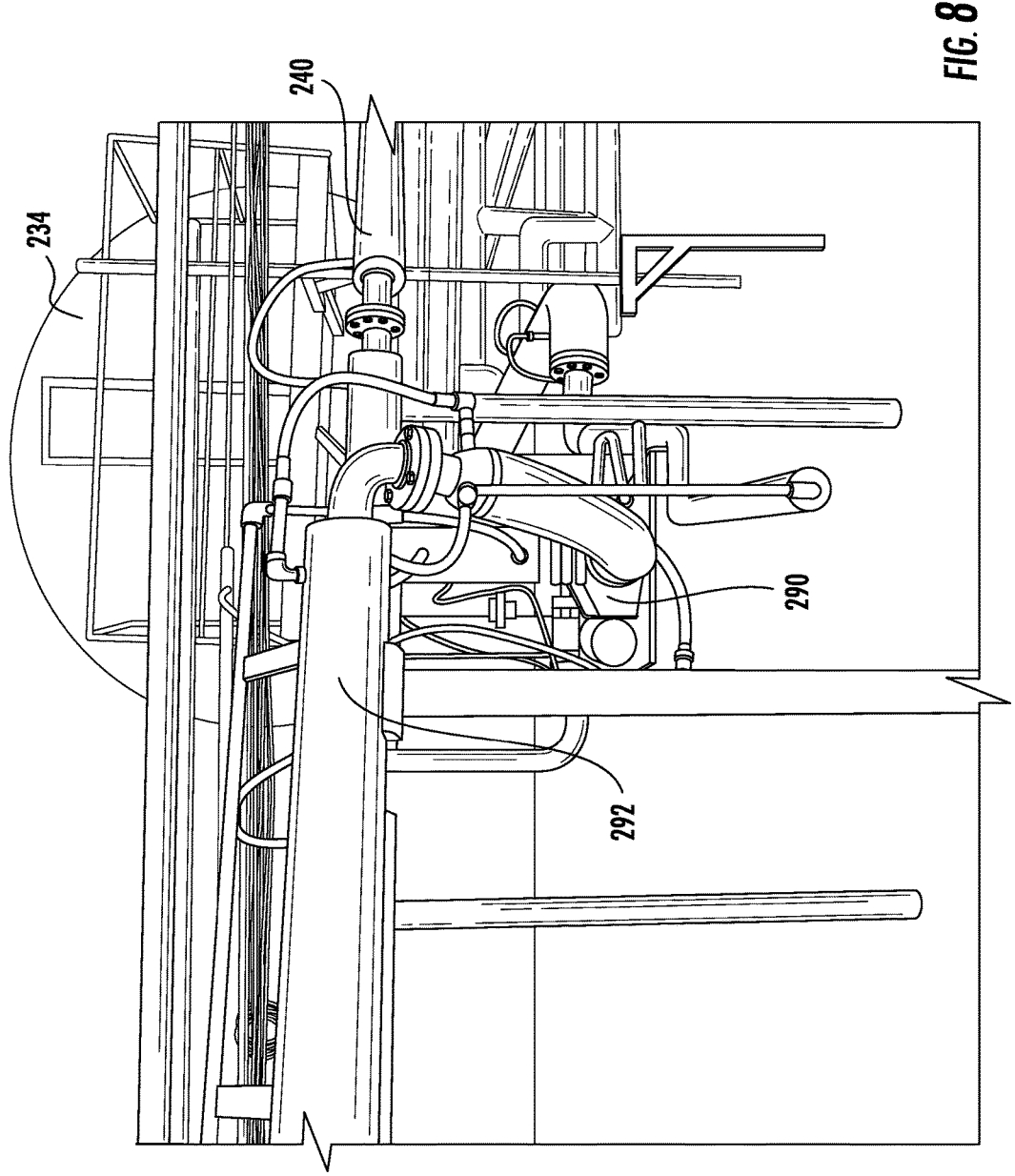
FIG. 8 illustrates a side view of a storage tank for a fluid asphalt input of the system of FIGS. 2-4 according to an example embodiment of the present disclosure.

The heated injection line 240 that directs the fluid asphalt input 210 (see, e.g., FIG. 3) to the fluid asphalt inlet port 254 is further illustrated in FIG. 5. FIG. 8 illustrates the heated tank 234 from which the fluid asphalt input 210 is received. As illustrated, in some embodiments the fluid asphalt input 210 leaving the heated tank 234 may be directed through a valve 290 (e.g., a three-way valve) before entering the heated injection line 240 that leads to the preliminary mixing unit 218 (see, e.g., FIG. 3). The valve 290 may also connect to a heated injection line 292 that leads to a traditional asphalt mixing unit for production of asphalt mix without usage of the asphalt shingle input, when desired. For example, the heated injection line 292 may lead substantially directly to the primary mixing unit 204 (see, e.g., FIG. 3), such that the primary mixing unit may optionally be used without the asphalt shingle input in some embodiments. In other words, the primary mixing unit 204 may mix the fluid asphalt input 210 with the particulate input 268, and optionally the recycled asphalt input 214 when the valve 290 directs the fluid asphalt input directly to the primary mixing unit. Accordingly, the system may be provided with the ability to produce asphalt including or excluding the asphalt shingle input.

As further illustrated in FIG. 5, the preliminary mixing unit 218 may further comprise one or more load cells 288. The load cells 288 may be employed to determine the mass of the fluid asphalt input 210 and/or the mass of the asphalt shingle input 216 directed into the tank 244. Thereby, a proper mixture thereof may be achieved.

Figure 9:
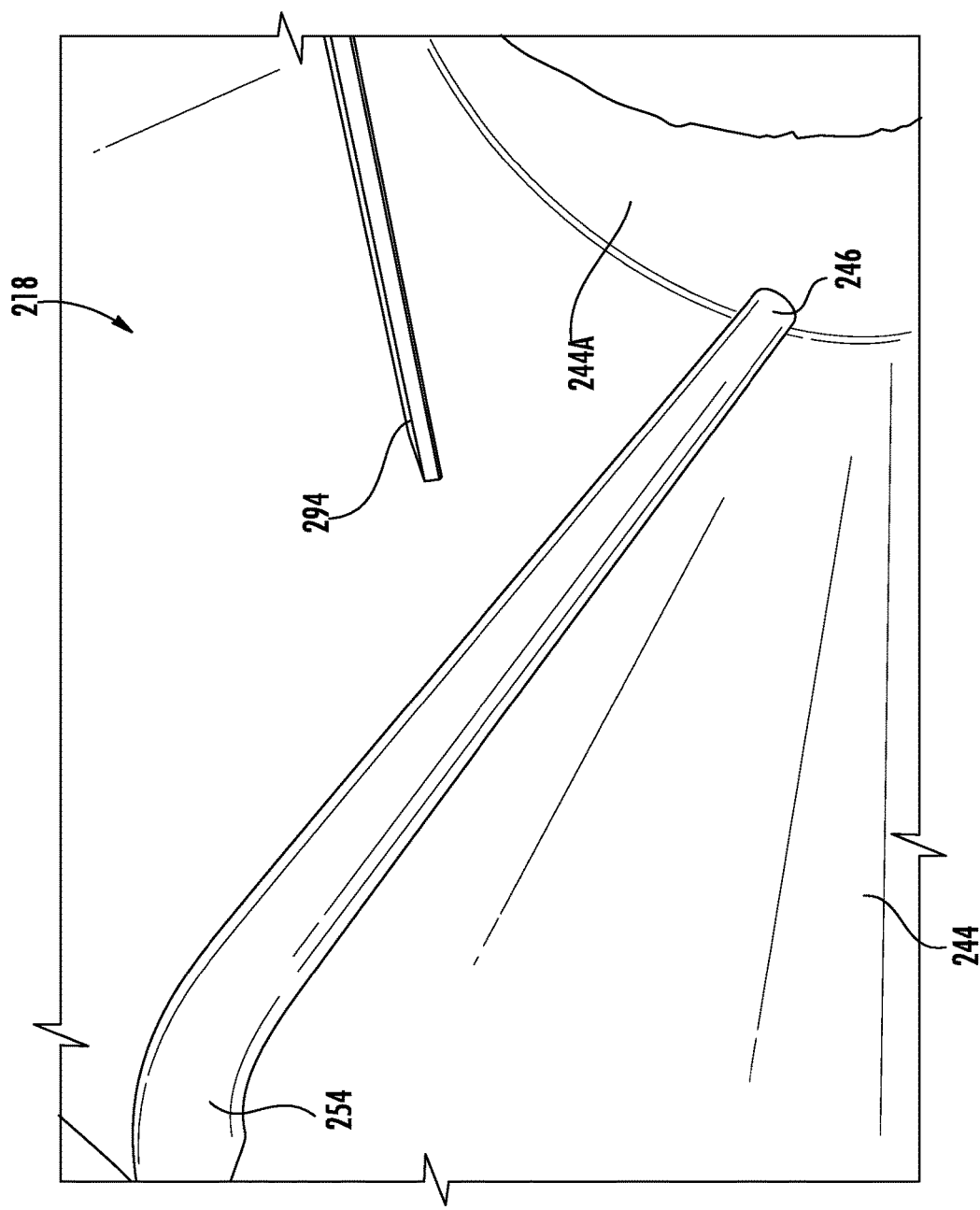
FIG. 9 illustrates an internal view of a tank of the preliminary mixing unit of the system of FIGS. 2-4 according to an example embodiment of the present disclosure.

FIG. 9 illustrates the inside of the tank 244 of the preliminary mixing unit 218. As illustrated, the fluid asphalt inlet port 254 is configured to direct the fluid asphalt input 210 (see, e.g., FIG. 3) to the nozzle 246, which may be positioned proximate a bottom 244A of the tank 244. Thereby, issues with respect to the fluid asphalt input 210 splattering out of the tank 244 or sticking to the top of the sides of the tank without reaching the bottom 244A of the tank may be avoided. In contrast, as illustrated in FIG. 5, the asphalt shingle input inlet port 252 may be configured to discharge the asphalt shingle input 216 proximate a top 244B of the tank 244. In this regard, the asphalt shingle input 216 (see, e.g., FIG. 3) may comprise solids, which may not splatter like a fluid.

Figure 10:
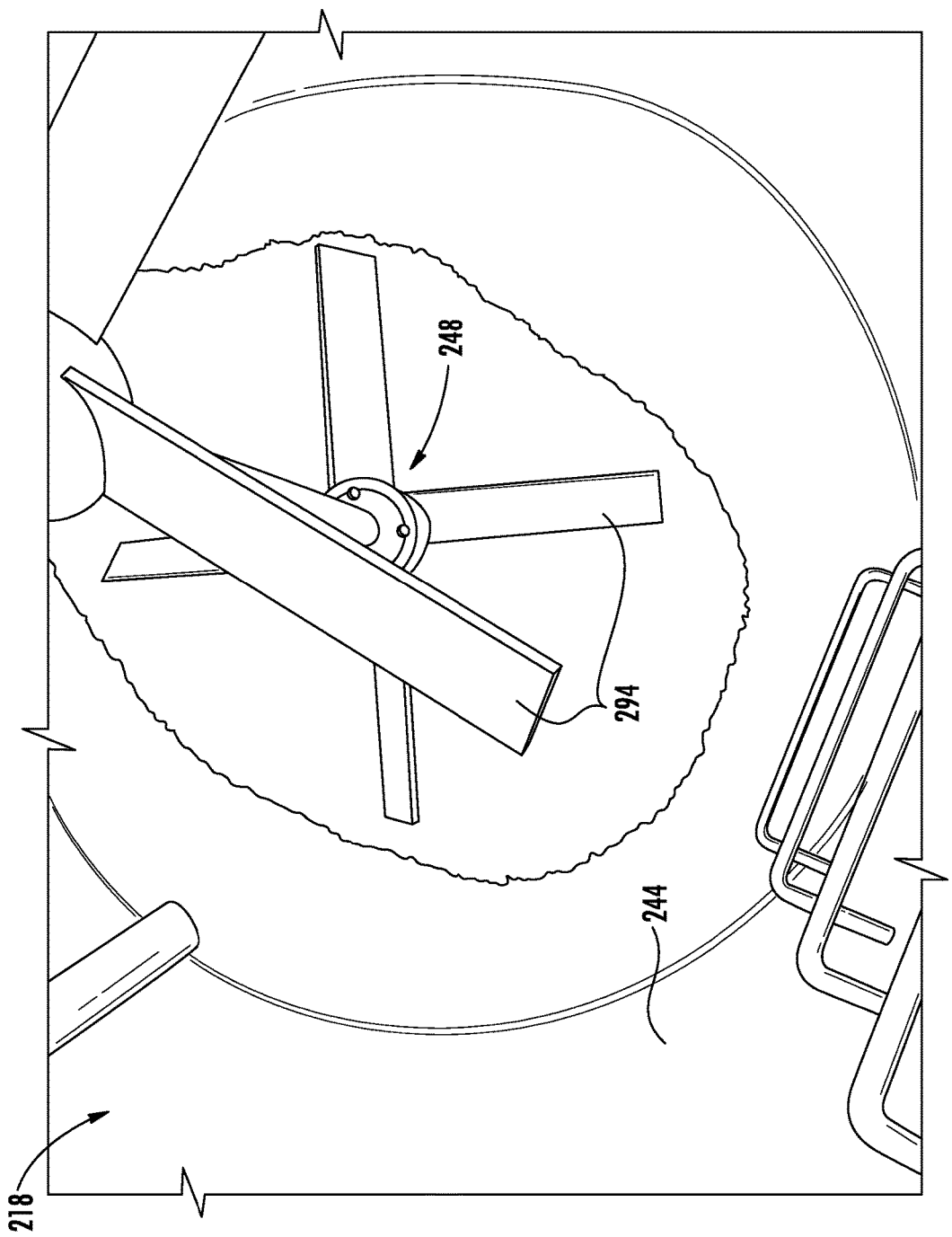
FIG. 10 illustrates an alternative internal view of the tank of FIG. 9 according to an example embodiment of the present disclosure.

As illustrated in FIG. 10, the mixer 248 may include a plurality of blades 294. The blades 294 may agitate and mix the asphalt shingle input 216 with the fluid asphalt input 210 as the asphalt shingles melt. Once the asphalt shingle input 216 is fully melted, continued heating and agitation in the preliminary mixing unit 218 and optionally the intermediate tank 272 may prevent precipitation of solids from the molten asphalt 220. In this regard, such precipitates may reduce the quality of any resultant asphalt product in the same manner as solids that are never fully melted would.

Figure 11:
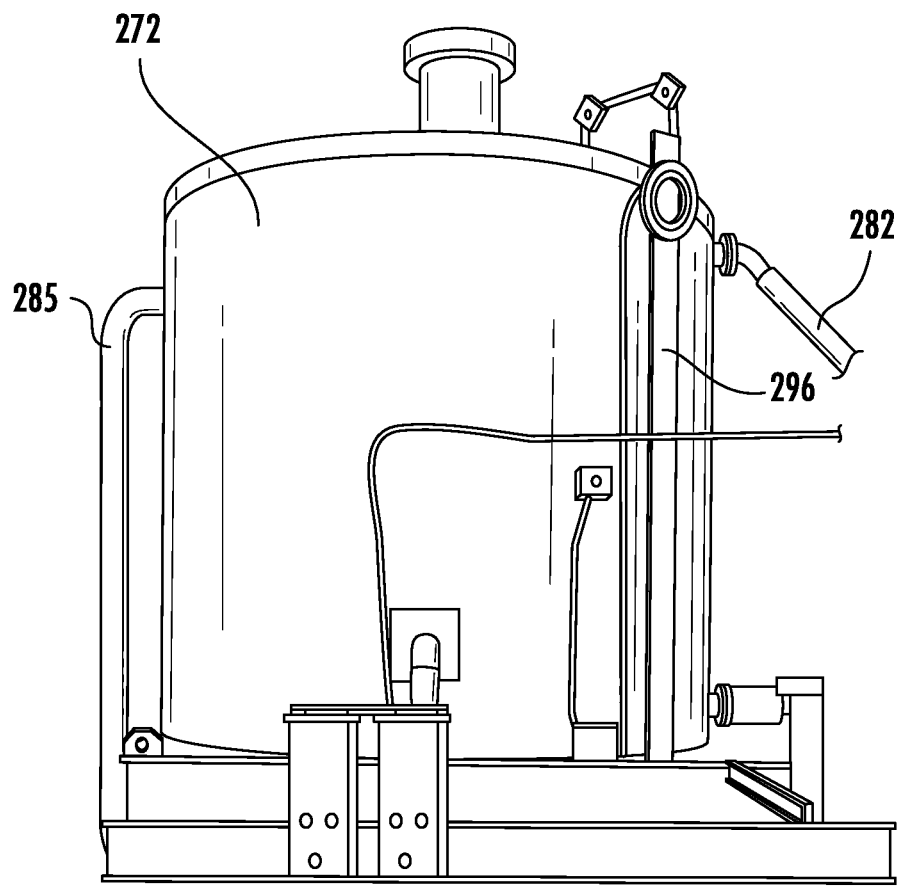
FIG. 11 illustrates a side view of the intermediate tank of FIG. 4 according to an example embodiment of the present disclosure.

After the molten asphalt 220 (see, e.g., FIG. 3) is formed, the molten asphalt may be directed through the strainer 255, the pump 256, and the heated injection line 262, or as illustrated in FIG. 11, the intermediate tank 272 may receive the molten asphalt 220 through a heated injection line 285. As further illustrated in FIG. 11, the intermediate tank 272 may include a level gauge 296 indicating the amount of the molten asphalt 220 received therein.

Figure 12:
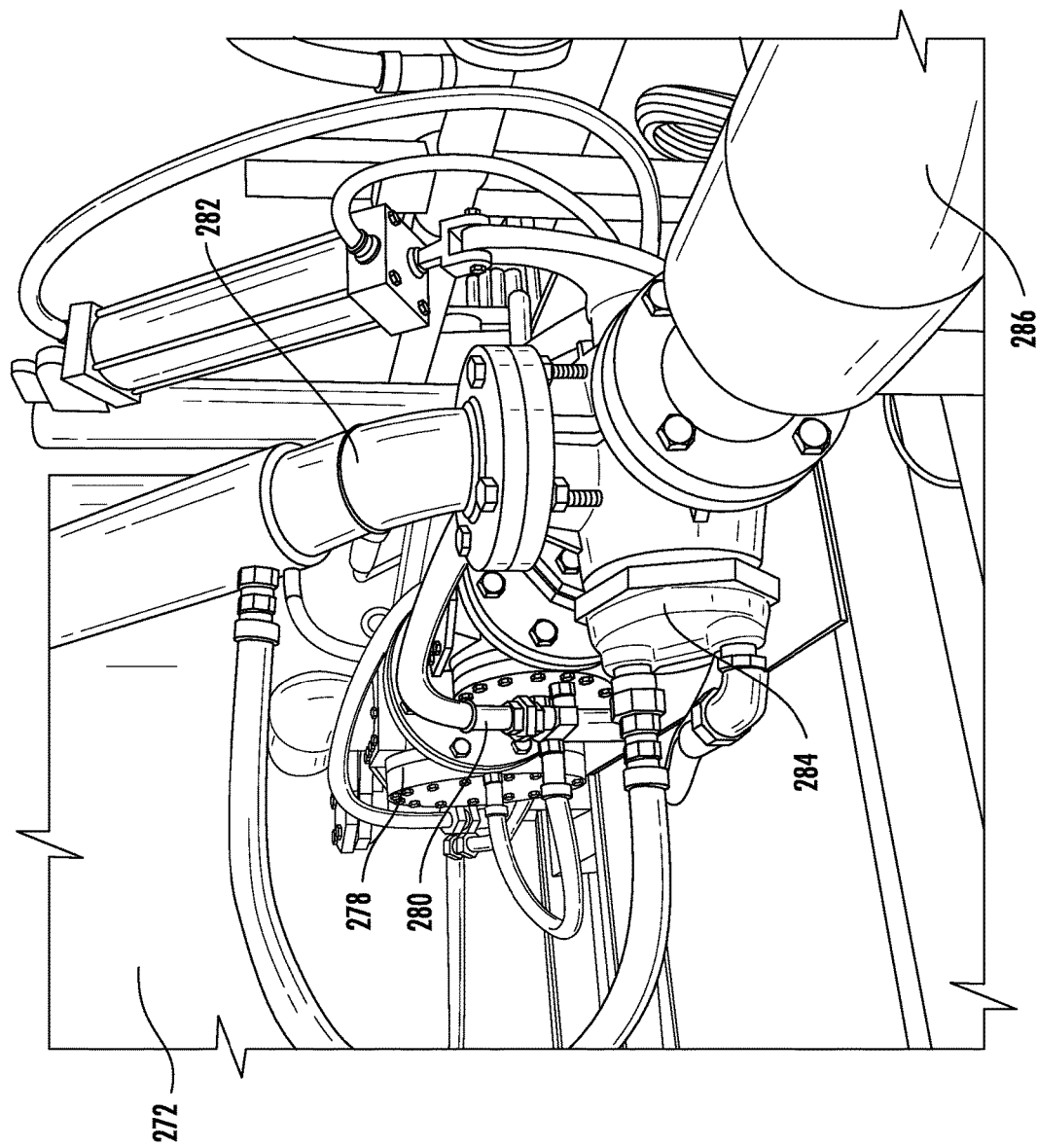
FIG. 12 illustrates an alternative side view of the intermediate tank of FIG. 4 according to an example embodiment of the present disclosure.

As illustrated in FIG. 12, the molten asphalt 220 may be directed through the strainer 278 and into one or both of the recirculation loop 282 and the heated injection line 286, depending on the position of the valve 284. Recirculation may be conducted until a desired quantity of the molten asphalt 220 is received in the intermediate tank 272, at which time the valve 284 may direct the molten asphalt through the heated injection line 286 to the primary mixing unit 204 (see, e.g., FIG. 4).

Each of the conduits and other components handling fluid substances described herein may be heated. For example, a heated fluid (e.g., oil or steam) may be circulated amongst the components to maintain the fluidity of the asphalt materials. By way of example, each of the conduits transporting the fluid asphalt materials may include an outer conduit that surround an inner conduit. The inner conduit may transport the asphalt materials (e.g., the molten asphalt 220), and the outer conduit may transport the heated fluid (e.g., oil or steam) so as to heat the asphalt materials received in the inner conduit to maintain the fluidity thereof.

Figure 13:
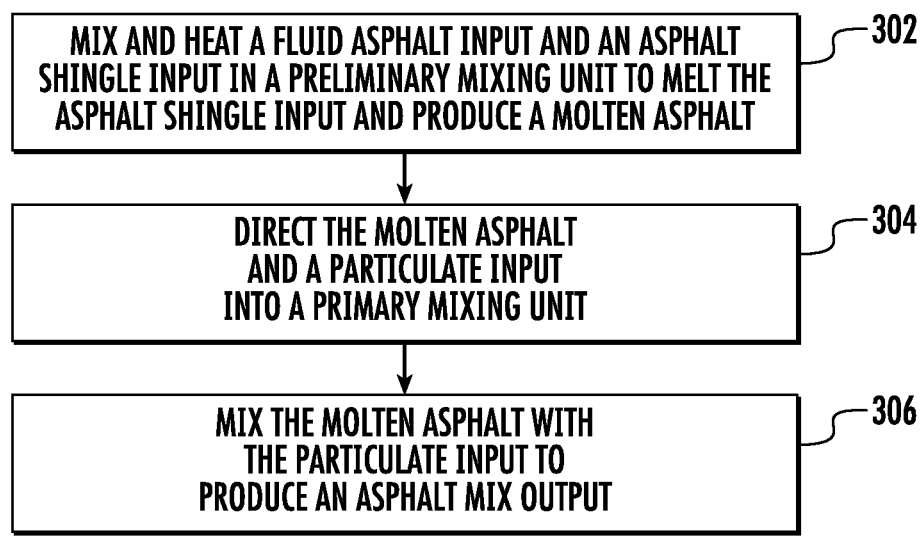
FIG. 13 schematically illustrates a method for producing an asphalt mix according to an example embodiment of the present disclosure.

A method for producing asphalt mix is also provided. As illustrated in FIG. 13, the method may include mixing and heating a fluid asphalt input and an asphalt shingle input in a preliminary mixing unit to melt the asphalt shingle input and produce a molten asphalt at operation 302. Further, the method may include directing the molten asphalt and a particulate input into a primary mixing unit at operation 304. The method may additionally include mixing the molten asphalt with the particulate input to produce an asphalt mix output at operation 306.

In some embodiments the method may further comprise directing a recycled asphalt input into the primary mixing unit. Additionally, the method may include mixing the recycled asphalt input with the molten asphalt and the particulate input to produce the asphalt mix output. Further, the method may include directing the molten asphalt through a strainer prior to directing the molten asphalt into the primary mixing unit at operation 304.

The method may additionally include directing the molten asphalt to an intermediate tank before directing the molten asphalt into the primary mixing unit at operation 304. The method may also include directing the fluid asphalt input to a bottom of the preliminary mixing unit. Further, the method may include grinding a plurality of asphalt shingles to produce the asphalt shingle input. Additionally, the method may include recirculating the molten asphalt at the preliminary mixing unit.

Figure 14:
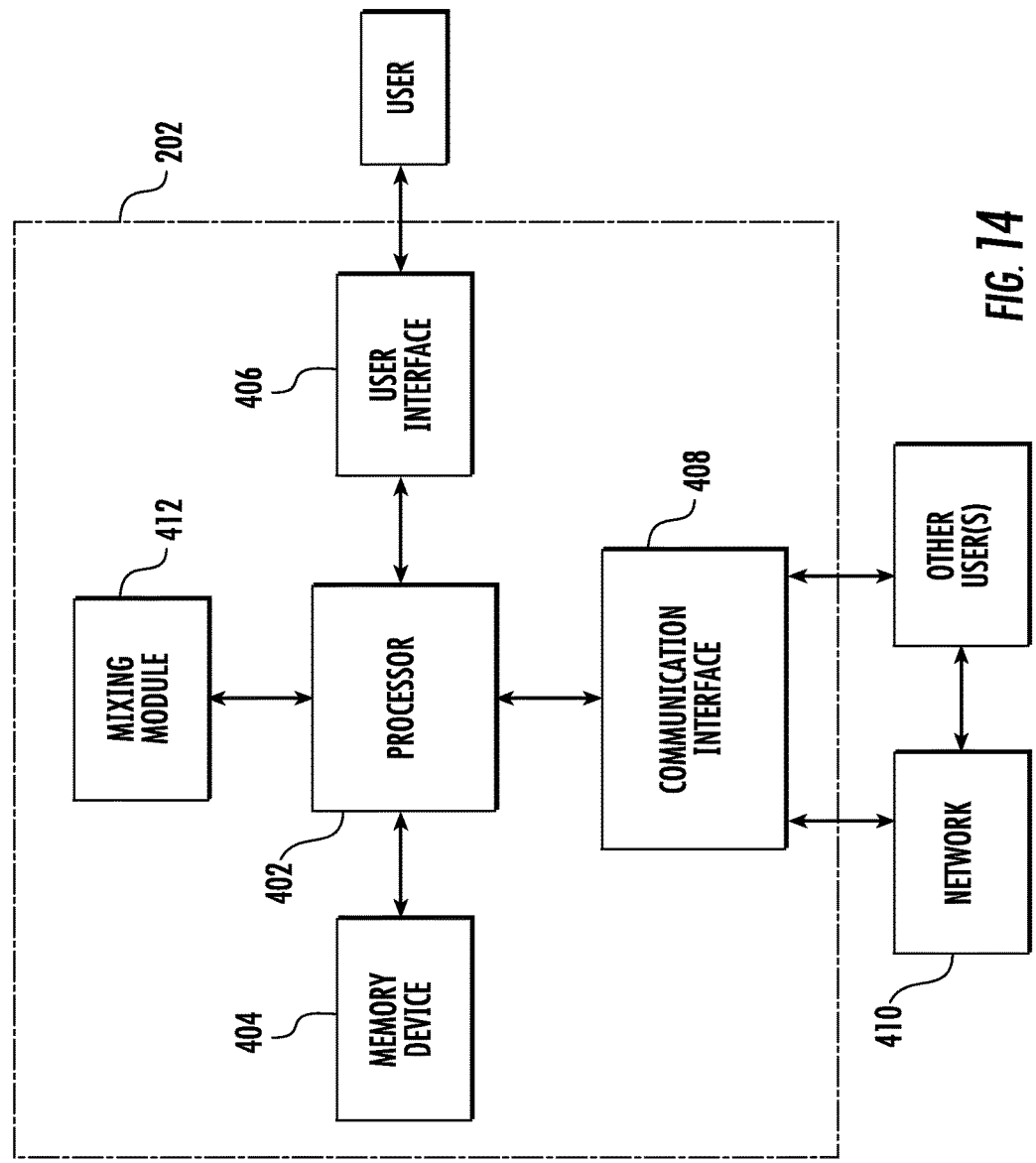
FIG. 14 schematically illustrates a controller of the system of FIGS. 2-4 according to an example embodiment of the present disclosure.

FIG. 14 schematically illustrates an embodiment of the controller 202. The controller 202 may be configured to execute computer code for performing the operations described herein. In this regard, as illustrated in FIG. 4, the controller 202 may comprise a processor 402 that may be a microprocessor or a controller for controlling the overall operation thereof. In one embodiment the processor 402 may be particularly configured to execute program code instructions related to the functions described herein, including the operations for forming the molten asphalt 220 from the asphalt shingle input 216 and the fluid asphalt input 210 and ultimately producing the asphalt mix output 212 (see, FIGS. 2, 3, and 4). The controller 202 may also include a memory device 404. The memory device 404 may include non-transitory and tangible memory that may be, for example, volatile and/or non-volatile memory. The memory device 404 may be configured to store information, data, files, applications, instructions or the like. For example, the memory device 404 could be configured to buffer input data for processing by the processor 402. Additionally or alternatively, the memory device 404 may be configured to store instructions for execution by the processor 402.

The controller 202 may also include a user interface 406 that allows a user to interact therewith. For example, the user interface 406 can take a variety of forms, such as a button, keypad, dial, touch screen, audio input interface, visual/image capture input interface, input in the form of sensor data, etc. Still further, the user interface 406 may be configured to output information to the user through a display, speaker, or other output device. A communication interface 408 may provide for transmitting and receiving data through, for example, a wired or wireless network 410 such as a local area network (LAN), a metropolitan area network (MAN), and/or a wide area network (WAN), for example, the Internet. The communication interface 408 may enable the controller 202 to communicate with one or more further computing devices, either directly, or via the network 410. In this regard, the communication interface 408 may include one or more interface mechanisms for enabling communication with other devices and/or networks. The communication interface 408 may accordingly include one or more interface mechanisms, such as an antenna (or multiple antennas) and supporting hardware and/or software for enabling communications via wireless communication technology (e.g., a cellular technology, communication technology, Wi-Fi and/or other IEEE 802.11 technology, Bluetooth, Zigbee, wireless USB, NFC, RF-ID, WiMAX and/or other IEEE 802.16 technology, and/or other wireless communication technology) and/or a communication modem or other hardware/software for supporting communication via cable, digital subscriber line (DSL), USB, FireWire, Ethernet, one or more optical transmission technologies, and/or other wireline networking methods. Further, the controller 202 may include a mixing module 412. The mixing module 412 may be configured to, in conjunction with the processor 402, direct operations for forming the molten asphalt 220 from the asphalt shingle input 216 and the fluid asphalt input 210 and/or ultimately producing the asphalt mix output 212 (see, e.g., FIGS. 2 and 3) as described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling the above-described operations. In particular, computer readable code may be configured to perform each of the operations of the methods described herein and embodied as computer readable code on a computer readable medium for controlling the above-described operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

As noted above, the controller 202 may be configured to execute computer code for performing the above-described mixing operations. In this regard, an embodiment of a non-transitory computer readable medium for storing computer instructions executed by a processor in a controller (e.g. controller 202) configured to form the molten asphalt 220 from the asphalt shingle input 216 and the fluid asphalt input 210 and/or ultimately produce the asphalt mix output 212 (see, e.g., FIGS. 2, 3, and 4) is provided. The non-transitory computer readable medium may thus include program code instructions for performing the operations disclosed herein.

Note that although the apparatuses, systems, and methods provided herein are generally described as being used in the production of asphalt pavement, such apparatuses, systems, and methods may be employed to produce other asphalt-based products. For example, the apparatuses, systems, and methods of the present disclosure may be employed to produce asphalt shingles. In this regard, the apparatuses, systems, and methods of the present disclosure are configured to recycle any asphalt-based products into a form usable as an input for the production of any asphalt-based product. Accordingly, the description regarding usage of asphalt shingles as the recycled input and description regarding usage of the output for the production of asphalt pavement is provided for example purposes only.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for producing an asphalt mix, comprising:
providing asphalt shingle material from a first feed system including a source of the asphalt shingle material;
providing fluid asphalt material from a second feed system including a source of the fluid asphalt material;
providing recycled asphalt material from a third feed system including a source of the recycled asphalt material;
providing particulate material from a fourth feed system including a source of the particulate material;
receiving, in a tank of a preliminary mixing unit, an asphalt shingle material input from said first feed system and a fluid asphalt material input from said second feed system;

heating and melting, by a heater of the preliminary mixing unit, the asphalt shingle material and the fluid asphalt material in the tank;

agitating, by a mixer of the preliminary mixing unit, the asphalt shingle material and the fluid asphalt material in the tank to produce a molten asphalt;

recirculating the molten asphalt through a recirculation loop in the tank;

outputting the molten asphalt to an intermediate tank positioned downstream of the preliminary mixing unit and upstream of a primary mixing unit;

recirculating, in the intermediate tank, the molten asphalt until either a sufficient quantity of the molten asphalt is received from the preliminary mixing unit or until the primary mixing unit is ready for receipt of the molten asphalt;

receiving, in the primary mixing unit, the recycled asphalt material input from said third feed system and the particulate material input from said fourth feed system; and mixing the molten asphalt output from said preliminary mixing unit with the recycled asphalt material and the particulate material to produce an output of said asphalt mix.

2. The method of claim 1, further comprising filtering particles from the output of the molten asphalt through a strainer, wherein the strainer is positioned downstream of the preliminary mixing unit.

3. The method of claim 1, wherein receiving the asphalt shingle material input from said first feed system comprises receiving the asphalt shingle material proximate a top of the tank of the preliminary mixing unit.

4. The method of claim 3, wherein receiving the fluid asphalt material input from said second feed system comprises receiving the fluid asphalt material proximate a bottom of the tank of the preliminary mixing unit using a nozzle in communication with the source of the fluid asphalt material.

5. The method of claim 1, further comprising grinding a plurality of asphalt shingles to produce the asphalt shingle material using a grinder in the first feed system.

6. The method of claim 1, further providing the first feed system with a feed hopper and a conveyor.

7. The method of claim 1, further providing the second feed system with a heated tank and a pump.

8. The method of claim 7, wherein receiving, in the tank of the preliminary mixing unit, the fluid asphalt material input from said second feed system comprises transmitting a fluid additive from the second feed system to the preliminary mixing unit.

9. The method of claim 1, further providing at least one of the third and fourth feed systems with belt scales.

10. The method of claim 1, further comprising heating the asphalt mix in the primary mixing unit, the primary mixing unit including a heater.

* * * * *